United States Patent [19]

Harrison

[11] 4,166,576
[45] Sep. 4, 1979

[54] LOCK VALVE FOR SPRINKLER

[75] Inventor: Richard J. Harrison, Boca Raton, Fla.

[73] Assignee: Safe-T-Lawn, Inc., Hialeah, Fla.

[21] Appl. No.: 842,612

[22] Filed: Oct. 17, 1977

[51] Int. Cl.² .............................................. B05B 1/30
[52] U.S. Cl. ..................................... 239/11; 239/539; 239/600
[58] Field of Search ..................................... 239/538–, 239/542, 600, 11; 251/89, 90

[56] References Cited

U.S. PATENT DOCUMENTS

| 979,955 | 12/1910 | Hulings | 239/539 |
| 1,931,761 | 10/1933 | Hertel | 239/541 X |
| 2,650,132 | 8/1953 | Reinecke | 239/542 |

Primary Examiner—John J. Love
Attorney, Agent, or Firm—Eugene F. Malin; Barry L. Haley

[57] ABSTRACT

In an adjustable valve means in a sprinkler device, a locking system that includes a breakaway wedging member connected to an adjustable two part sprinkler device and a wedging cavity positioned between the two parts of the sprinkler device to lock the two relatively moveable parts together.

2 Claims, 3 Drawing Figures

LOCK VALVE FOR SPRINKLER

BACKGROUND OF THE INVENTION

This invention relates to the field of irrigation devices and more particularly to such devices which are easily connectable to a water line to allow water to be metered out of said line at a given specified rate.

A variety of spray head devices for metering water from a water line exists in the prior art include such devices as bubblers and spray means. Such bubblers or spray means are basically simple in construction having cylindrical bodies connectable at one end to a water line and having circular covers over the body which allow for metering the outflow of water from the covered end of the body. Bubblers and spray means can be used to slowly supply small amounts of water to a given area or to flood the area with water. It is often important to the person using the bubbler or spray means to set the flow rate at a constant rate for an extended period of time. In order to keep the flow rate constant the relative position between the body and the cover must be maintained. This invention provide a solution for locking the relative position without the use of tools. A complicated system would be unacceptable because it may be inconvenient for the user or would greatly add to the expense of making inexpensive bubblers or spray means. Visible locking systems would be easily released by vandals who might change the flow rate without the knowledge of the user and thus detrimently affect the irrigated vegetation. The present device offers a new and improved solution to these problems.

BRIEF SUMMARY OF THE INVENTION

This invention relates to a locking system for an adjustable sprinkler head valve in a bubbler or spray head which is easily attachable to a water line. The adjustable valve device allows water to be metered out of said line at a variable rate. More particularly a device including a body and a cover moveably connected to the body for adjusting the valve. The body may be cylindrical in shape with an elongated locking means that may be a wedged shaped protuberance extending downward from one end of said cylindrical body portion or from the cover. The cover may be basically circular in shape and having a downwardly extending flange that covers the side of the body. The body includes a lower opening for the inflow of water and an upper opening for outflow of water. The cover includes a nozzle means for dispensing water received from the upper opening in the body. The outflow rate is adjustable by movement of the cover up or down by a threaded member in the body. A wedging cavity is positioned between the flange of the cover and the side of the body. The wedged shaped protuberance is easily detachable or broken away from the body so that it may be forced into the wedging cavity between the body and the flange of the cover so as to lock the cover and body portions into a fixed position relative to one another and prevent any misadjustment of the outflow rate from the nozzle. The wedge shaped protuberance may be removed to readjust the outflow rate.

The bubbler or spray means includes two components, a cylindrical body and a circular cover connectable to the body via an interconnecting screw or bolt. Both components are preferable constructed of an easily moldable, rigid, durable plastic material. The lower opening of one end of said cylindrical body is threaded so that it may be easily connected to a water pipe externally threaded. The cylindrical body has two portions or two sections. The upper portion has a multiplicity of apertures therein. The cover extends into the body opening to reduce pressure. Portions 22' extend into cavity 22 to reduce output pressure in the discharged fluid. A circular aperture has a smaller circular aperture that is threaded so as to be capable of receiving a flow rate control screw. An elongated shaped protuberance that may be wedge shaped or another shape extends vertically and downwardly for the lower portion of the body or cover. The circular cover has an outer diameter and circumference slightly larger than the outer diameter and circumference of the cylindrical body. An outer flange surrounds the cover and extends vertically downward from the lower outer edge of the cover. The cover has a multiplicity of nozzles apertures therein and has a threaded circular opening in its center. The flow rate control screw fits into the threaded circular opening in the center of the cover.

In order to use the device, the bubbler is connected to an input pipe, the valve is adjusted and then the wedge shaped protuberance is broken away from the body portion at the border area. When the water is turned on it flows through the body. The water then flows between the upper surface of the cylindrical body and the bottom surface of the cover until it escapes via the nozzles in the cover. Since the body and cover are adjustably connected via a screw the distance between the two components may be adjusted and hence the flow of water can be adjusted by simply turning the cover. When the desired flow rate is achieved, the wedged shaped object previously broken off from the body is forced into the wedging cavity between the body and the cover thus locking the cover and body into a fixed position relative to one another.

In accordance with the above described structure and operation it is the primary object of this invention to provide a device for metering the flow of water from a line at a specified rate having an adjustable valve means lockable into place so as to continue to meter water at any given rate.

Another object is to provide such a device where the valve means may be locked into place without the use of tools.

Another object is to provide such a device that may be withdrawn to readjust the valve means without the aid of tools.

Still another object of the invention is to provide such a device and locking system which is composed of an easily moldable, rigid, durable and non-corrosive plastic.

Yet another object of this invention is to provide such metering device and locking system which is resistant to the accidental readjustment and tampering of vandals.

Another object is to provide such a device and locking system which may be simply and inexpensively manufactured.

These together with other objects which will become apparent to those skilled in the art upon reading the details of construction and operation as more fully set forth hereinafter, reference being had to the accompanying drawings forming a part hereof, wherein like numerals refer to like parts throughout.

DETAILED DESCRIPTION OF PREFERRED EMBODIMENTS OF THE INVENTION

Before the present metering device and locking system generally referred to by numeral 10 is specifically described, it is to be understood that the invention is not limited to the particular arrangement of parts here shown, as such devices may vary. It is also to be understood that the phraseology or terminology herein used is for the purposes of description and not of limitation, as the scope of the present invention is denoted by the appended claims.

Figure 1:
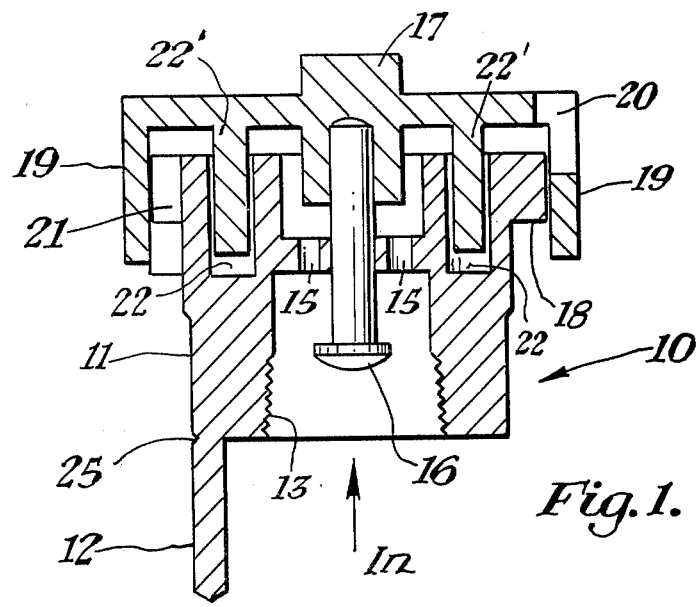
FIG. 1 is a cross-sectional side view of the adjustable sprinkler and locking system.
Figure 2:
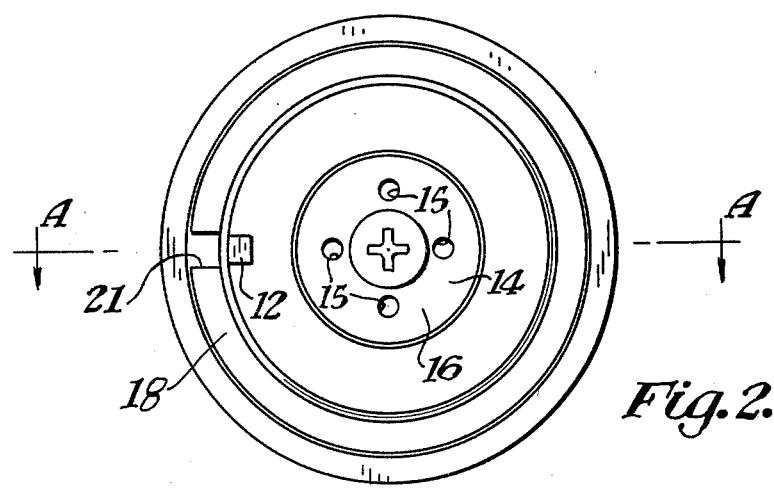
FIG. 2 is a bottom view of the sprinkler shown in FIG. 1.
Figure 3:
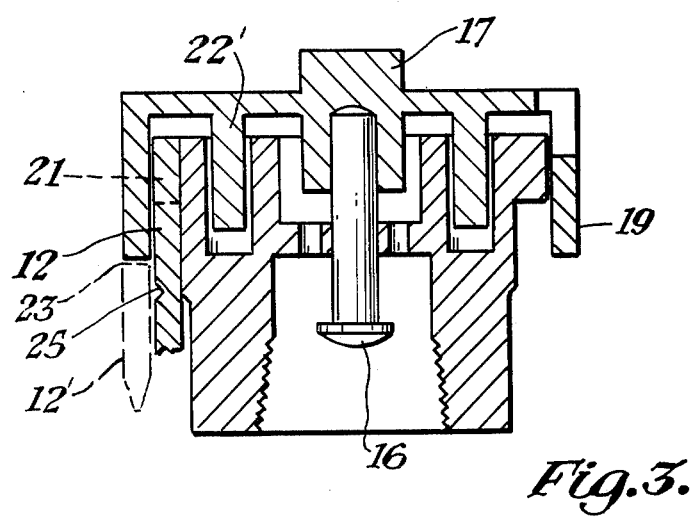
FIG. 3 is a cross-sectional side view as shown in FIG. 1 with the wedged shaped protuberance broken off from the cover and positioned in locking position in the wedging cavity.

Referring now to the drawings and in particular to FIGS. 1, 2 and 3 which is a cross-sectional view of the device and locking system 10. The cylindrical body portion 11 has a wedged shaped protuberance 12 extending from the bottom edge of the body 11. The protuberance may have a larger proximal portion and a smaller distal end. The distal end will be larger than the dimensions of the wedging cavity 21. The protuberance 12 may also be of a uniform width that is slightly larger than cavity 21. Further gripping undulatation may be associated along the proximal portion to aid in insertion and withdrawal of the protuberances.

The lower portion of the internal diameter and circumference of the body 11 has threadings 13 thereon so that the device 10 may be easily and securely attached to a water pipe (now shown). A circular portion 14, more easily viewed in FIG. 2, generally divides the body into upper and lower portions or sections. The circular portion 14 has a multiplicity of apertures 15 therein. The outside apertures are fluid channels. A threadable adjusting screw 16 fits in and passes through the central aperture and extends into the center of the cover 17. The cover 22' extends into the body opening 22 to reduce pressure. The body as an upper outwardly extending flange 18 that has an outside circumferential dimension less than the inside diameter of the cover flange 19.

The cover 17 is circular and is large enough to extend just beyond the circumferential body. The cover has flanges 19 along its edge. The circular flange 19 is connected to the cover 17, the flange extending vertically downward along the entire circumference of the cover and covers and flanged edge 18 of the body 11. The cover 17 has one or more nozzle aperture 20 therein.

Referring now to FIG. 2, the flanged upper edge 18 can be viewed from the bottom and it may have a notch 21 to provide a wedging cavity to receive the protuberance 12. The wedging cavity may also be in the cover or partially in the cover and the body.

It should be noted that the protuberance or the made locking means 12 may include a portion of notch 12.

Referring now to FIG. 3, in order to use the device and locking system, the bubbler is attached to a water pipe (not shown) and after the water is then turned to provide fluid flow through the body, the aperture 15, under cover 17 and out nozzle 20 in cover 17. The cover 17 is rotated on screw 16 to adjust the cover up and down in relation to the body 11. The relative distance between the cover 17 and body 11 is easily adjusted by turning the cover 17 on screw 16. Once the flow rate has been adjusted to the desired flow rate, the insertion member 12 is broke off the cover at 23 and forced into the wedging cavity or notch 21 creating a frictional lock. The cover 17 is thus locked into place at the desired flow rate without the use of tools. The wedge may be removed to readjust the bubbler. The insertion member 12 may include an aperture, notch 25 or other means to aid in withdrawing the insertion means. Further, the insertion member 12 may be connected to the cover as illustrated by dotted lines number 12'.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a sprinkler system including at least a two part sprinkler device having one part connected to and relatively movable in relation to said second part and said relatively movable parts provide an adjustable valve means for controlling outflow of fluid between said one part and said second part, comprising:

said one part is a body member having an input end and an output end with side walls around a fluid channel, said second part is a cover member with side wall portions movable up and down relative to said output end and said side walls, a frictional locking means including a breakaway insertion member removably connected to said one of the two parts, a cavity means positioned between the two parts for inserting after removal said insertion member into said cavity means to wedge lock said valve means in a particular position to prevent movement.

2. A locking method for a sprinkler system that includes at least two relatively movable parts that control the outflow of fluid that passes out between the two parts and thereafter flows from the nozzle comprising the steps of:

adjusting the two relatively movable parts to provide a particular rate of flow of fluid out between the two parts and out of the nozzle, detaching an insertion wedge lock member from one of said parts to which it is removably detachable, and locking the position of the two movable parts by insertion of said insertion wedge lock member into a locking cavity between the two parts to lock the two parts together to prevent further relative movement of the two movable parts.

* * * * *